UNITED STATES PATENT OFFICE.

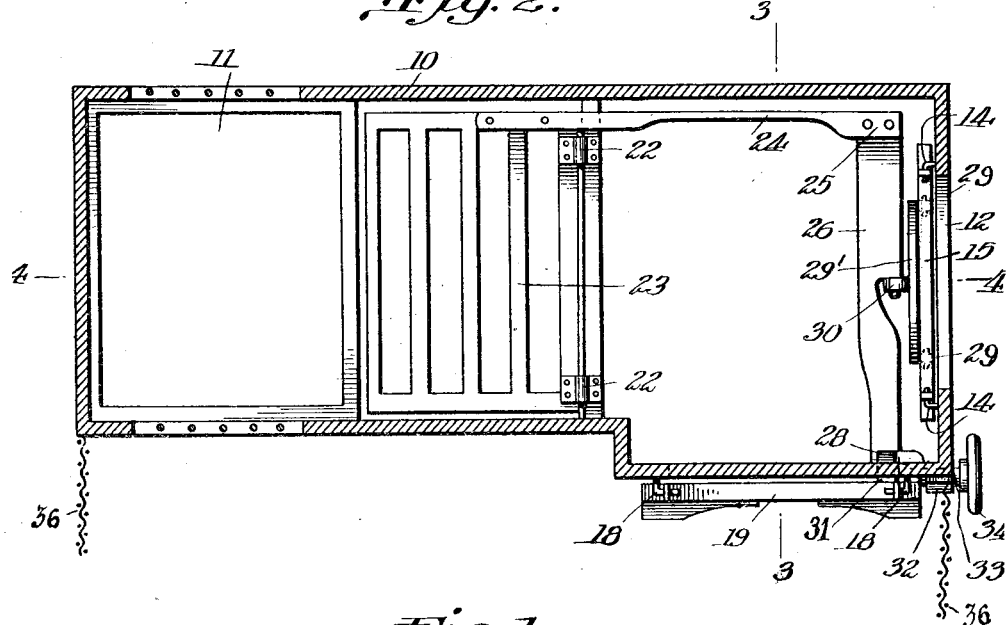

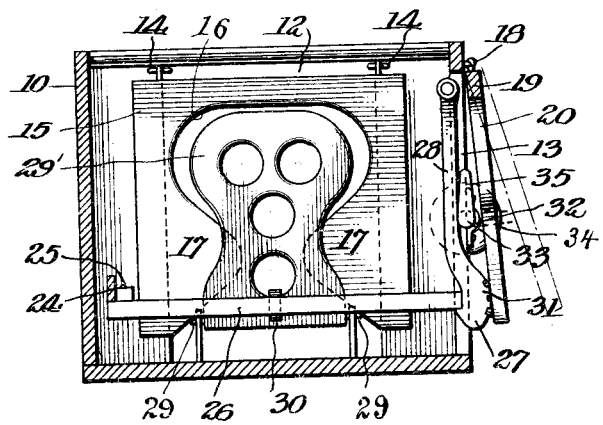
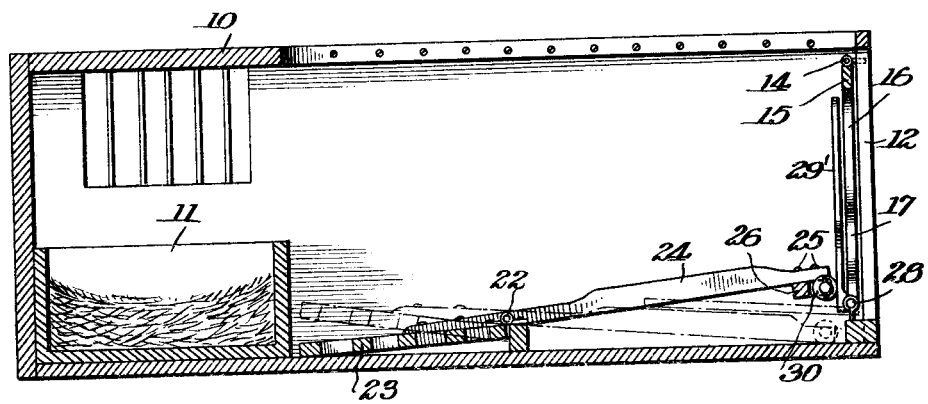

CHARLES T. KING, OF MOLINE, ILLINOIS, ASSIGNOR OF ONE-FOURTH TO HORACE M. ANDERSON, OF MOLINE, ILLINOIS.

TRAP-NEST.

1,138,664.  Specification of Letters Patent.   Patented May 11, 1915.

Application filed March 17, 1914. Serial No. 825,319.

*To all whom it may concern:*

Be it known that I, CHARLES T. KING, citizen of the United States, residing at Moline, in the county of Rock Island and State of Illinois, have invented certain new and useful Improvements in Trap-Nests, of which the following is a specification.

This invention relates to improvements in hens' nests of the class known as trap nests, and has for one of its objects to improve the construction and increase the efficiency of devices of this character.

Another object of the invention is to provide a simply constructed trap nest arranged to permit access to the nest through one wall and provide for the departure of the hen after laying the egg through another of the walls so that the entering hens and the departing hens do not interfere with each other.

With these and other objects in view the invention consists in certain novel features of construction as hereinafter shown and described and then specifically pointed out in the claims; and in the drawings illustrative of the preferred embodiment of the invention Figure 1 is a side elevation of the improved nest. Fig. 2 is a section on the line 2—2 of Fig. 1. Fig. 3 is a section on the line 3—3 of Fig. 2. Fig. 4 is a longitudinal section on the line 4—4 of Fig. 2.

Corresponding and like parts are referred to in the following description and indicated in all the views of the drawings by the same reference characters.

The improved device comprises an inclosing casing 10 preferably oblong and of any suitable material and provided with a nest box 11 at one end. The walls of the receptacle 10 may be of any suitable arrangement, open or slatted work, to provide the requisite ventilation, while at the same time securing the necessary seclusion to the hens while laying. Formed through one wall of the casing 10, preferably the end farthest from the nest 11, is an opening indicated at 12, while a similar opening indicated at 13 is formed through another wall of the member 10, preferably through one of the sidewalls. Suspended by hinges indicated at 14 in front of the opening 12 and internally of the casing 10 is a member 15 which thus swings inwardly of the casing. The member 15 is provided with an opening relatively large at its upper end as indicated at 16 with the sides of the member 15 directed inwardly as represented at 17 near the lower end of the opening. Swingingly supported at 18 above the opening 13 is a member 19 similar to the member 15 and arranged to swing outwardly from the casing 10 as shown. The member 19 is provided with an opening 20 similar to the opening 16 and with inwardly directed lower portions 21 similar to the portions 17, the object to be hereafter explained.

Hingedly connected at 22 in the lower portion of the casing 10 is a platform 23, preferably formed of a plurality of spaced slats and extending between hinged portions 22 and the nest box 11. Extending from the platform 23 toward the front end of the casing 10 is an arm 24, and connected at 25 to the forward end of the member 24 is another arm 26 which extends in parallel relation to the front of the casing and likewise in parallel relation to the member 15. The arm 26 extends through the side wall of the casing 10 and is adapted to be engaged by the barbed terminal 27 of a swinging arm 28, the barb 27 being so arranged that when engaged by the member 26 the latter will be held in its elevated position as shown in Figs. 1 and 3, and with the platform 23 in its depressed position. Mounted to swing at 29 near the bottom of the casing 10 is a closure member 29' which is adapted when in elevated position to prevent the entrance of a hen through the opening 12, the member 29' being preferably provided with relatively large openings to admit light and likewise to reduce the weight. The arm 26 is preferably provided with an anti-friction roller 30 which engages the member 29' when the member 26 is in its elevated position as shown. At its lower end the member 28 is formed with a relatively wide portion 31 which extends into the path of the member 19 as shown in Fig. 3. The member 24 is relatively slight transversely and will freely bend when the member 19 strikes the enlarged terminal 31 of the member 28 and thus detach the member 26 from the barb 27, as hereafter explained.

With a device thus constructed the operation is as follows: To set the nest, if the parts are disposed as shown in Figs. 3 and 4, the member 19 is swung outwardly upon its hinges 18 and permitted to drop, the impact of the member 19 against the enlarged portion 31 of the member 28 forcing the member 26 endwise and bending the relatively slight member 24 laterally and thus throwing the free end of the member 26 from engagement with the barb 27, and thus permitting the member 26, which is of sufficient weight to overbalance the platform 23, to drop and thus releases the member 29′ and permits the latter to drop into horizontal position and over the member 26. The opening 16 is thus left unguarded, and the hen in passing to the nest 11 engages the inwardly directed portions 17 and carries the member 15 inwardly with her, which drops back to its horizontal position when the hen passes from beneath it. As the hen passes over the platform 23, which is in its elevated position, the latter is depressed by the weight of the hen and the member 26 elevated which movement causes the roller 30 to engage the member 29′ and elevate the same into its vertical position, and at the same time the free end of the member 26 engages the barb 27 of the member 28 and displaces the latter and permits the barb to engage beneath the free end of the member 26 and thus locks the parts in the position shown in Fig. 4 and maintains the member 29′ in front of the opening 16 and thus prevents another hen from passing to the nest so long as the first hen remains in position. After the egg is laid the hen passes over the platform 23 into the body of the casing 10, but does not move the member 23 because the latter is in its downward position and bears by its inner end upon the floor of the casing. The only exit to the hen is through the opening 13 partly closed by the member 19 which is caused to swing outwardly as the hen passes through the opening and engages the inwardly directed portions 21, and as the hen passes from beneath the member 19 the latter drops and applies a relatively heavy blow to the projecting portion 31 of the member 28 and thus bends the member 24 as before described and releases the member 26 from engagement with the barb and permits the weight of the member 26 to depress the member 24 and elevate the platform 23 into its former position, this movement likewise releasing the member 29′ which drops into its horizontal position, as before described, and again provides free access to the nest for the next hen. Mounted for rotation in a hanger 32 on the casing 10 near the exit opening 13 is a small shaft 33 having a turn knob 34 at its outer end and a lateral arm 35 at the inner end, the latter operating against the inner face of the swinging member 19 to hold the latter away from the casing when the shaft is disposed in one position, as shown by dotted lines in Fig. 3, to prevent the member 19 from striking the member 28—27 and releasing the closure 29′ when the hen passes through the exit 13.

By this means one hen at a time may be "trapped" and the owner enabled to ascertain what hens operate the nest but lay no eggs. This locking arrangement also enables the owner to keep the eggs laid by any particular hen separate from others. The lock feature is therefore an important element of applicant's device and adds materially to its value and efficiency.

The casing 10 is inclosed in a suitable yard formed by poultry fencing or the like, as indicated at 36, so that the hens who have used the nest do not again mingle with the hens who have not used the nest. The two classes of hens are thus kept separate and the hen upon the nest is protected from intrusion during the egg laying operation.

The improved device is simple in construction, can be inexpensively manufactured and of any suitable material, and arranged in groups or separate as may be preferred.

Having thus described the invention, what is claimed as new is:

1. An apparatus of the class described comprising an inclosure having an inlet and an outlet, a closure for the inlet movable inwardly by gravity, a member within the inclosure and adapted to be actuated by a hen and including an arm extending into the path of the inlet closure and operative to close the same when actuated, a catch device adapted to automatically engage said arm and hold it in engagement with the inlet closure, and means operative by a hen in passing through the outlet for releasing said catch device.

2. An apparatus of the class described, comprising an inclosure having an inlet and an outlet, a nest within the inclosure, a movably supported closure for the inlet, a platform movably supported between the nest and the inlet and adapted to be operated by a hen in passing to the nest, means connected to said platform and including a member extending into the path of said inlet closure for actuating the same and holding it in closed position, a catch device in position to engage said closure holding member, and a movable member adapted to be displaced by the hen in passing through the outlet and engaging the catch device to release the inlet closure holding member therefrom.

3. An apparatus of the class described comprising an inclosure having an inlet and an outlet, a nest within the inclosure, a movably supported closure for the inlet, a platform movably supported between the nest and the inlet and adapted to be operated by a hen in passing to the nest, means connected to said platform and including a member extending into the path of said inlet closure for actuating the same and holding it in closed position, and means adapted to be displaced by the hen in passing through the outlet to release the inlet closure holding means at its return movement.

4. An apparatus of the class described comprising an inclosure having an inlet and an outlet, a nest within the inclosure, a movably supported closure for the inlet, a platform movably supported between the nest and the inlet and adapted to be operated by a hen in passing to the nest, means connected to said platform and including a member extending into the path of said inlet closure for actuating the same and holding it in closed position, a catch device in position to engage said closure holding member, and a movable member adapted to be displaced by the hen in passing through the outlet and engaging the catch device to release the inlet closure holding member therefrom at its return movement.

5. An apparatus of the class described comprising an inclosure having an inlet and an outlet, a nest within the inclosure, a movably supported closure for the inlet, means adapted to be operated by a hen in passing to the nest for actuating said inlet closure, means adapted to be operated by a hen in passing through the outlet for releasing the inlet closure, and means for locking said releasing means from action.

6. An apparatus of the class described comprising an inclosure having an inlet and an outlet, a nest within the inclosure, a movably supported closure for the inlet, a platform movably supported between the nest and the inlet and adapted to be operated by a hen passing to the nest, means connected to said platform and including a member extending into the path of said inlet closure and actuating the same and holding it in closed position, a catch device in position to engage said closure holding member, a movable member adapted to be displaced by the hen in passing through the outlet and adapted to engage the catch device to release the inlet closure holding member therefrom at its return movement, and means for locking said movable member from action.

7. An apparatus of the class described comprising an inclosure having an inlet and an outlet, a nest within the inclosure, a movably supported closure for the inlet, means operative by a hen in passing to the nest for closing said inlet closure and holding it in closed position, a catch device in position to engage said closure holding means, and a movable member adapted to be displaced by the hen passing in through the outlet and engaging the catch device to release the inlet closure holding means therefrom at its return movement.

8. An apparatus of the class described comprising an inclosure having an inlet and an outlet, a nest within the inclosure, a movably supported closure for the inlet, means operative by a hen in passing to the nest for closing said inlet closure and holding it in closed position, a catch device in position to engage said closure holding means, a movable member adapted to be displaced by a hen in passing through the outlet and engaging the catch device to release the inlet closure holding means therefrom at its return movement, and means for holding said movable member out of action.

9. An apparatus of the class described comprising an inclosure having an inlet and an outlet, a nest within the inclosure, a movably supported closure for the inlet, means operative by a hen in passing to the nest for closing said inlet closure and holding it in closed position, a catch device in position to engage said closure holding means, a movable member adapted to be depressed by a hen in passing through the outlet and engaging the catch device to release the inlet closure holding means therefrom at its return movement, and an arm adapted to be extended into the path of said movable member to hold the same out of action.

In testimony whereof I affix my signature in presence of two witnesses.

CHARLES T. KING. [L. S.]

Witnesses:
O. W. SWENSSON,
OSCAR ALDERE.

Copies of this patent may be obtained for five cents each, by addressing the "Commissioner of Patents, Washington, D. C."